(12) United States Patent
Courtier-Dutton et al.

(10) Patent No.: US 9,336,212 B2
(45) Date of Patent: May 10, 2016

(54) SYSTEMS AND METHODS FOR COLLECTION AND AUTOMATIC ANALYSIS OF OPINIONS ON VARIOUS TYPES OF MEDIA

(71) Applicants: David Anthony Courtier-Dutton, Berkshire (GB); James Alexander Maurice Ernest Sopper, London (GB); Andrew James Dodd, Berkshire (GB); Madeleine Rebecca Ayers, London (GB); Grace Margaret Hammond, Berkshire (GB); Marc Walter Reimann, Newbury (GB); Joel Robert Sisco, Stamford, CT (US)

(72) Inventors: David Anthony Courtier-Dutton, Berkshire (GB); James Alexander Maurice Ernest Sopper, London (GB); Andrew James Dodd, Berkshire (GB); Madeleine Rebecca Ayers, London (GB); Grace Margaret Hammond, Berkshire (GB); Marc Walter Reimann, Newbury (GB); Joel Robert Sisco, Stamford, CT (US)

(73) Assignee: SLICETHEPIE LIMITED, Reading (GB)

( * ) Notice: Subject to any disclaimer, the term of this patent is extended or adjusted under 35 U.S.C. 154(b) by 241 days.

(21) Appl. No.: 13/965,519

(22) Filed: Aug. 13, 2013

(65) Prior Publication Data

US 2014/0122504 A1 May 1, 2014

Related U.S. Application Data

(60) Provisional application No. 61/720,130, filed on Oct. 30, 2012.

(51) Int. Cl.
*G06F 17/30* (2006.01)

(52) U.S. Cl.
CPC .............................. *G06F 17/30038* (2013.01)

(58) Field of Classification Search
None
See application file for complete search history.

(56) References Cited

U.S. PATENT DOCUMENTS

| 6,578,008 B1 * | 6/2003 | Chacker ........................ 705/7.32 |
| 7,162,433 B1 * | 1/2007 | Foroutan ....................... 705/7.42 |
| 7,827,054 B2 * | 11/2010 | Campbell et al. ............ 705/7.32 |

(Continued)

*Primary Examiner* — Hung Le

(74) *Attorney, Agent, or Firm* — McClure, Qualey & Rodack, LLP

(57) ABSTRACT

Systems and methods for collection and automatic analysis of opinions of media are provided. A representative method includes: receiving, from a user, media for review; automatically distributing the media to a pool of reviewers based on reviewer profiles; receiving, from the reviewers, information corresponding to opinions pertaining to the media; automatically generating a report based, at least in part, on the information received from the reviewers; and providing the report to the user.

20 Claims, 11 Drawing Sheets

(56) References Cited

U.S. PATENT DOCUMENTS

| | | | |
|---|---|---|---|
| 7,921,028 B2* | 4/2011 | Cole | 705/7.11 |
| 8,019,641 B2* | 9/2011 | Foroutan | 705/12 |
| 8,027,867 B2* | 9/2011 | Blenk | 705/7.33 |
| 8,073,792 B2* | 12/2011 | Hughes | 706/21 |
| 8,200,663 B2* | 6/2012 | Jones et al. | 707/723 |
| 8,595,057 B2* | 11/2013 | Avedissian | 705/14.1 |
| 8,613,026 B2* | 12/2013 | Malhotra et al. | 725/62 |
| 8,645,844 B1* | 2/2014 | Strobel et al. | 715/751 |
| 2003/0014428 A1* | 1/2003 | Mascarenhas | 707/200 |
| 2007/0027706 A1* | 2/2007 | Murray | G06Q 10/063 705/7.11 |
| 2007/0027707 A1* | 2/2007 | Murray | G06Q 10/063 705/7.11 |
| 2007/0168354 A1* | 7/2007 | Ramer | G06F 17/30749 |
| 2009/0210444 A1* | 8/2009 | Bailey | G06Q 30/02 |
| 2012/0089617 A1* | 4/2012 | Frey | G06F 17/30867 707/748 |
| 2013/0085804 A1* | 4/2013 | Leff | G06Q 30/0219 705/7.29 |
| 2013/0117372 A1* | 5/2013 | Digate | G06Q 10/10 709/204 |
| 2013/0218884 A1* | 8/2013 | McConnell | G06F 17/30864 707/728 |
| 2013/0282611 A1* | 10/2013 | Avedissian | G06Q 30/02 705/347 |
| 2014/0129478 A1* | 5/2014 | Yamamoto | G06Q 30/0282 705/347 |
| 2014/0350962 A1* | 11/2014 | Robinson | G06F 19/321 705/3 |

* cited by examiner

302 — NICE DANCE INTRO. VERY CONTEMPORARY LYRICS BUT THE FLIP SIDE IS THAT THEY'LL AGE PRETTY QUICKLY DUE TO THE POP-CULTURE REFERENCE. IF A THROW-AWAY TRACK IS THE OBJECTIVE THEN SO BE IT. THE MALE VOCALS AREN'T TOO BAD THOUGH AND THE BACKING TRACK IS PRETTY GOOD AND VERY WELL PRODUCED.

0 — 10

SUBMIT

304 — 02:21   03:22

306 — WHICH OF THE FOLLOWING BEST DESCRIBES YOUR RELATIONSHIP STATUS?

SELECT THE MOST APPROPRIATE FROM THE LIST BELOW:

(MARRIED) (SINGLE) (LIVING WITH PARTNER) (DIVORCED) (WIDOWED)

308 — WHICH OF THE FOLLOWING BEST DESCRIBES YOUR CURRENT WORK STATUS?

PLEASE SELECT ONE OPTION FROM THE LIST BELOW:

(FULL TIME) (PART TIME) (UNEMPLOYED) (STUDENT)

SESSION EARNINGS: $0.00 — 310

BALANCE: $4.05 — 312

REFER A FRIEND

INVITE YOUR FRIENDS AND RECEIVE A BONUS OF 10% OF ALL THEIR SCOUT EARNINGS! COMMISSION FROM THEIR REVIEWS WILL BE ADDED STRAIGHT ON TO YOUR ACCOUNT BALANCE. SIMPLE!

(INVITE FRIENDS) (FAQs)

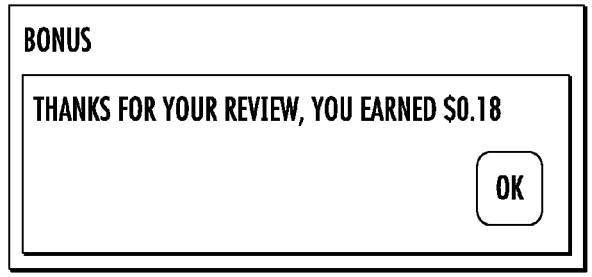
FIG. 7
FIG. 8
| MARKET POTENTIAL (UNITED STATES ONLY) | | | | | |
|---|---|---|---|---|---|
| OVERALL MARKET POTENTIAL | | | | | |
| 81% | | | ALBUM TRACK | SINGLE | STRONG SINGLE |
| | AVERAGE | ABOVE AVERAGE | GOOD | VERY GOOD | EXCELLENT |
| MARKET POTENTIAL WITHIN THE POP GENRE | | | | | |
| 75% | | | ALBUM TRACK | SINGLE | STRONG SINGLE |
| | AVERAGE | ABOVE AVERAGE | GOOD | VERY GOOD | EXCELLENT |
FIG. 9

| SUMMARY |
|---|
| THE TRACK IS A POTENTIAL SINGLE FOR THIS MARKET |
| THE TRACK WAS CLASSIFIED AS "VERY GOOD" WITHIN THE POP GENRE WITH AN IN-GENRE MARKET POTENTIAL OF 75% INDICATING IT IS A POTENTIAL SINGLE FOR THIS TARGET MARKET |
| THE TRACK RECEIVED A STRONG "LIKE" RATING FROM MALES |
| THE TRACK RECEIVED AN OVERALL TRACK RATING OF 7.7 |

SYSTEMS AND METHODS FOR COLLECTION AND AUTOMATIC ANALYSIS OF OPINIONS ON VARIOUS TYPES OF MEDIA

CROSS REFERENCE TO RELATED APPLICATION

This utility application claims priority to U.S. Provisional Application 61/720,130, filed on 30 Oct. 2012, which is incorporated by reference herein in its entirety.

BACKGROUND

Technical Field

The disclosure generally relates to systems and methods involved with the review of various media.

SUMMARY

Systems and methods for collection and automatic analysis of opinions of media are provided. An example embodiment, among various others, is a method that comprises: receiving, from a user, media for review; automatically distributing the media to a pool of reviewers based on reviewer profiles; receiving, from the reviewers, information corresponding to opinions pertaining to the media; automatically generating a report based, at least in part, on the information received from the reviewers; and providing the report to the user.

Another example embodiment is a system for collection and automatic analysis of opinions of media. The system is configured to: receive, from a user, media for review; automatically distribute the media to a pool of reviewers based on reviewer profiles; receive, from the reviewers, information corresponding to opinions pertaining to the media; automatically generate a report based, at least in part, on the information received from the reviewers; and provide the report to the user.

Another example embodiment is a non-transitory computer-readable medium having stored thereon computer-executable instructions for performing collection and automatic analysis of opinions of media. The computer-executable instructions are configured to: receive, from a user, media for review; automatically distribute the media to a pool of reviewers based on reviewer profiles; receive, from the reviewers, information corresponding to opinions pertaining to the media; automatically generate a report based, at least in part, on the information received from the reviewers; and provide the report to the user.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 6-8 are schematic diagrams depicting representative graphical user interfaces that may be used to implement functionality of an example embodiment.

FIGS. 9-20 are schematic diagrams depicting portions of an example embodiment of a report that may be automatically provided to a user by the system.

DETAILED DESCRIPTION

As will be described in detail, the present disclosure involves collection and automatic analysis of opinions pertaining to media of various types. By way of example, the media may be audio, images and/or video, with the subject matter of the media being of various types such as music, music videos, movies or retail products, among possible others. In some embodiments, users provide media for review to the system (such as by directly uploading the media f to the system or indirectly by providing the media to a third party that uploads the media). The system is networked with pools of reviewers who are available to review and provide opinions on the media. Notably, information about each reviewer (e.g., demographic information, tendency of the reviewer to provide an opinion that is representative of the consensus of opinions of the pool) is stored by the system. The system uses the information and the provided opinions to generate reports about the uploaded media for the user. For instance, such a report may indicate the predicted appeal of the media to a specific demographic of consumers.

Figure 1:
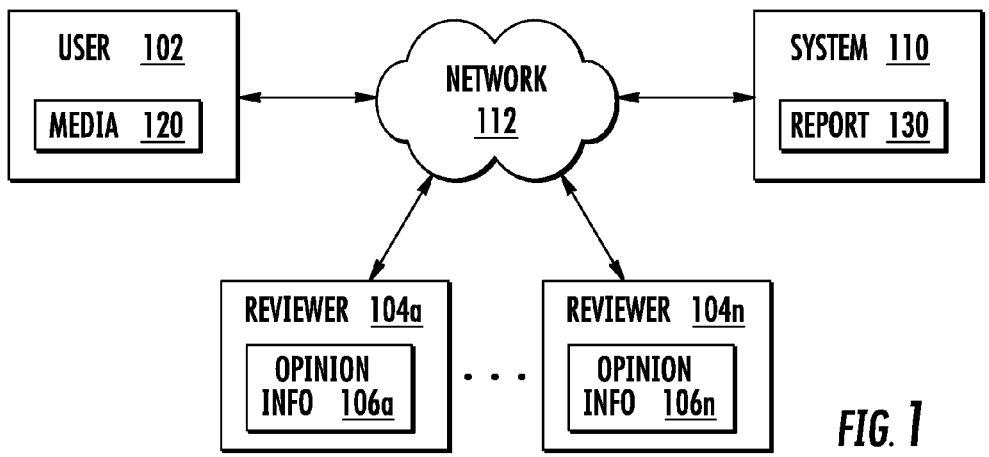
FIG. 1 is a schematic diagram of a representative networked environment in which an example embodiment of a system for collection and automatic analysis of opinions of media is implemented.

In this regard, FIG. 1 is a schematic diagram of an example embodiment of a system for collection and automatic analysis of opinions of media implemented in a networked environment. As shown in FIG. 1, a user 102 and multiple reviewers (e.g., reviewers 104a-104n) communicate with system 110 via a communications network 112. The communications network may comprise one or more of wired or wireless networks and may be implemented in one or more of various communications protocols for communicating information.

In the embodiment of FIG. 1, system 110 receives media content (e.g., media 114) that is provided by user 102 for review. By way of example, a user may upload media to a server of the system via the Internet. The system 110 also manages interactions with reviewers. In some embodiments, this may involve registering reviewers with the system, sorting reviewers into pools and managing reviewer accounts. Additionally, system 110 validates and grades opinions provided by the reviewers and generates reports that are provided to the users.

User 102 and the reviewers 104 may interact with network 112 and system 110 via various devices/systems. By way of example, a computer workstation or portable electronic device (e.g., a mobile phone) may be used.

In operation, system 110 receives information from user 102 that is used to establish the parameters of the interaction. By way of example, the user may provide information that uniquely identifies the user and which indicates the extent of review that is being requested. The user is also enabled to provide the media for review to system 110, such as by uploading the media (e.g., media 120) to the system via network 112. Notably, media 120 may be provided in one or more files of various formats.

Responsive to the receipt of the media 120 and the request of the user 102 for a review, the system designates one or more pools of reviewers to provide opinions about the media. In this example, the pool including reviewers 104a and 104n are designated. These reviewers provide opinions 106a and 106n, respectively, to the system 110. Notably, various manners of providing opinions may be used, such as scaled responses to various traits and free-form text-based review, and combinations thereof, among possible others as may be prompted by the system. The system 110, in turn, correlates the opinions with other information and generates a report 130 that is provided to the user.

Figure 2:
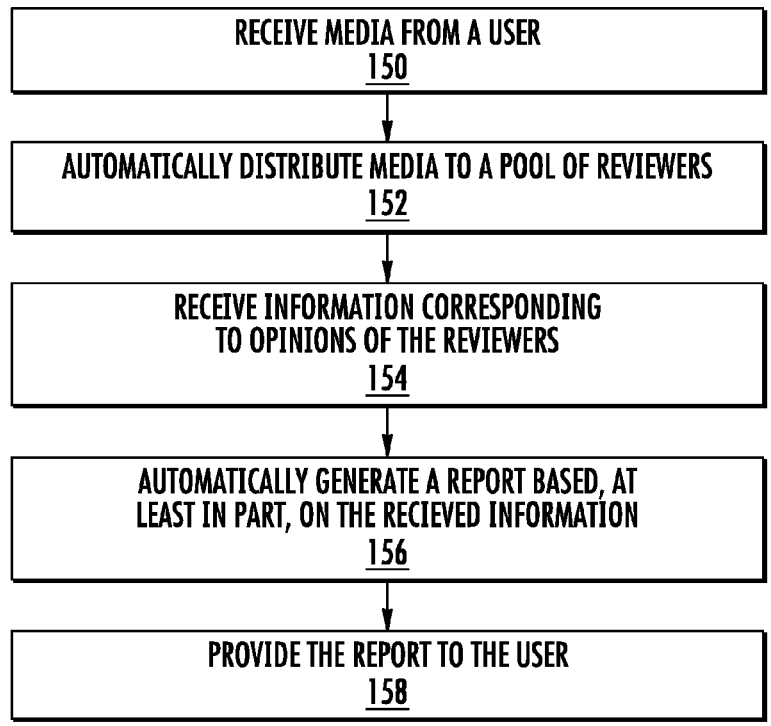
FIG. 2 is a flowchart depicting an example embodiment of a method for collection and automatic analysis of opinions of media.

FIG. 2 is a flowchart depicting an example embodiment of a method for collection and automatic analysis of opinions of media. As shown in FIG. 2, the method (e.g., functionality provided by system 100) may be construed as beginning at block 150, in which media is received from a user for review. In block 152, the media is automatically distributed to a pool of reviewers based on reviewer profiles. In block 154, information corresponding to opinions pertaining to the media is received from the reviewers. In some embodiments, the information corresponding to the opinions is validated (such as by determining whether the information appears to be thorough and relevant) and graded (such as by determining how well the information ranks among the information provided by other reviewers). Thereafter, a report based at least in part on the information received from the reviewers is automatically generated (block 156), and the report is provided to the user (block 158).

Figure 3:
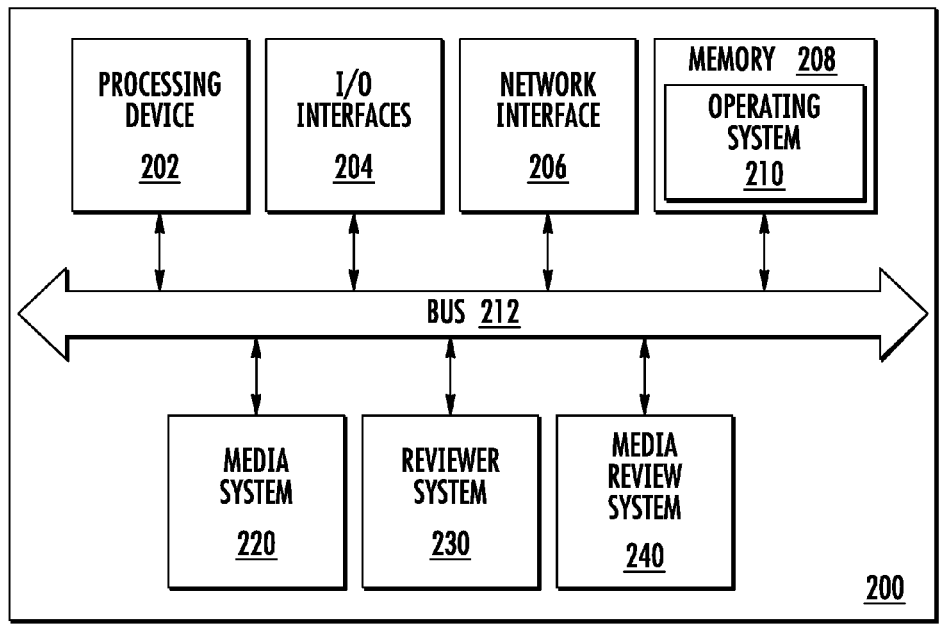
FIG. 3 is a schematic diagram of an example embodiment of an example embodiment of a system for collection and automatic analysis of opinions of media.

It should be noted that various functionality described above may be implemented in hardware, software and/or combinations thereof. For instance, one or more computers (configured as servers, for example) may be provided to perform at least some of the functionality described above. FIG. 3 is a schematic diagram of an example embodiment of such a system.

As shown in FIG. 3, system 200 incorporates a processing device (processor) 202, input/output interfaces 204, a network/connectivity interface 206, a memory 208, and an operating system 210, with each communicating across a local data bus 212. Additionally, system 200 includes a media system 220, a reviewer system 230 and a media review system 240, each of which may be stored in memory.

The processing device 202 may include a custom made or commercially available processor, a central processing unit (CPU) or an auxiliary processor among several processors, a semiconductor-based microprocessor (in the form of a microchip), one or more application specific integrated circuits (ASICs), a plurality of suitably configured digital logic gates, and other electrical configurations comprising discrete elements both individually and in various combinations to coordinate the overall operation of the system.

The memory 208 may include any one or a combination of volatile memory elements (e.g., random-access memory (RAM, such as DRAM, and SRAM, etc.)) and nonvolatile memory elements. The memory typically comprises native operating system, one or more native applications, emulation systems, or emulated applications for any of a variety of operating systems and/or emulated hardware platforms, emulated operating systems, etc. For example, the applications may include application specific software. In accordance with such embodiments, the components are stored in memory and executed by the processing device.

One of ordinary skill in the art will appreciate that the memory may, and typically will, comprise other components which have been omitted for purposes of brevity. Note that in the context of this disclosure, a non-transitory computer-readable medium stores one or more programs for use by or in connection with an instruction execution system, apparatus, or device.

Network/connectivity interface 206 comprises various components used to transmit and/or receive data over a networked environment. When such components are embodied as an application, the one or more components may be stored on a non-transitory computer-readable medium and executed by the processing device.

Figure 4:
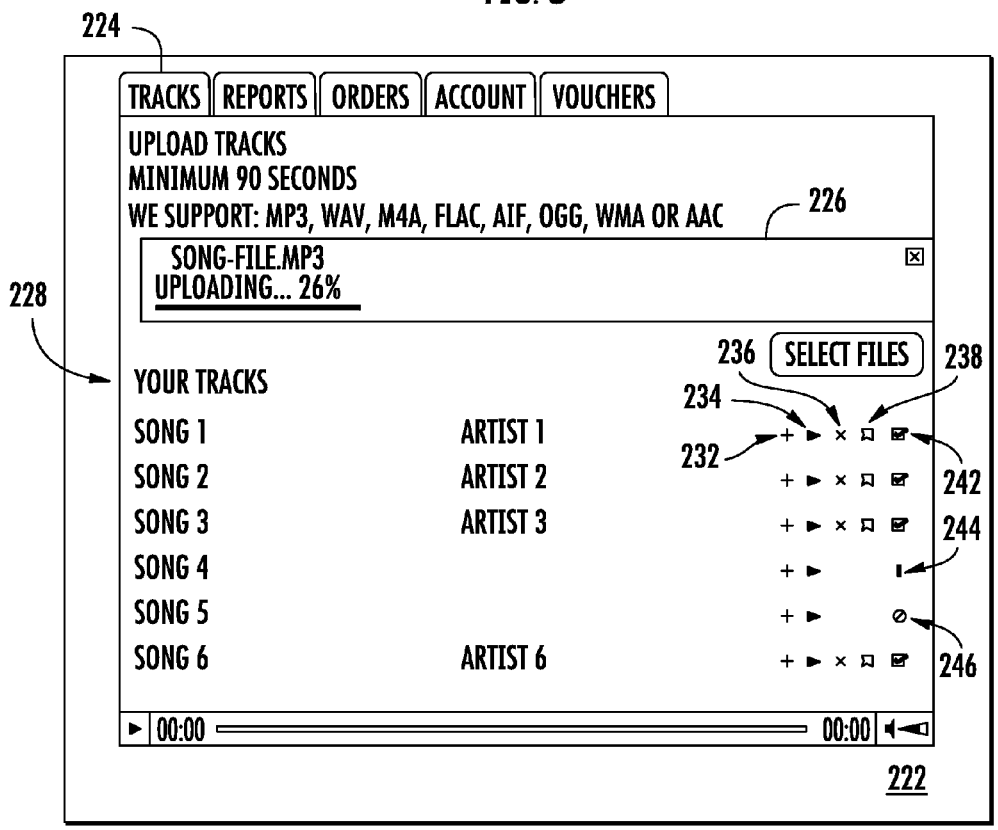
FIG. 4 is a schematic diagram depicting a representative graphical user interface that may be used to implement functionality of an example embodiment.

Generally, media system 220 receives media content that is provided by a user for review via the network/connectivity interface. An example of a user interface that may be used to facilitate upload of media for review is depicted in FIG. 4. As shown in FIG. 4, GUI 222 includes various tabs (e.g., Tracks tab 224, which is currently displayed), an upload field 226 (which depicts media upload progress) and a list of uploaded tracks 228.

Additionally, there are buttons to the right of the uploaded track names that include: an edit button 232, which enables editing of the track details, such as name, genre and artist; a play button 234, which appears after a track is successfully encoded and enables playing of the track; a delete button 236, which enables deletion of an uploaded track; a shopping cart button 238, which enables a user to order a report for the associated track; a check mark button 242, which indicates that a track has been successfully encoded; an exclamation button 244, which indicates that there is some information missing (e.g., artist name); and a warning button 246, which indicates that encoding of the track failed.

Returning to FIG. 3, reviewer system 230, which manages interactions with reviewers, assigns a pool of reviewers to provide opinions about the media. Media review system 240 validates and grades the opinions and generates a report that is provided to the user.

In an example system (such as system 200 of FIG. 3), a user establishes an account, uploads media (audio, video, still images, etc.), and orders market research based on the media. In some embodiments, the user is able to select the type of research they desire and, on payment of a fee, for example, the system may designate the media for review by reviewers.

Figure 5:
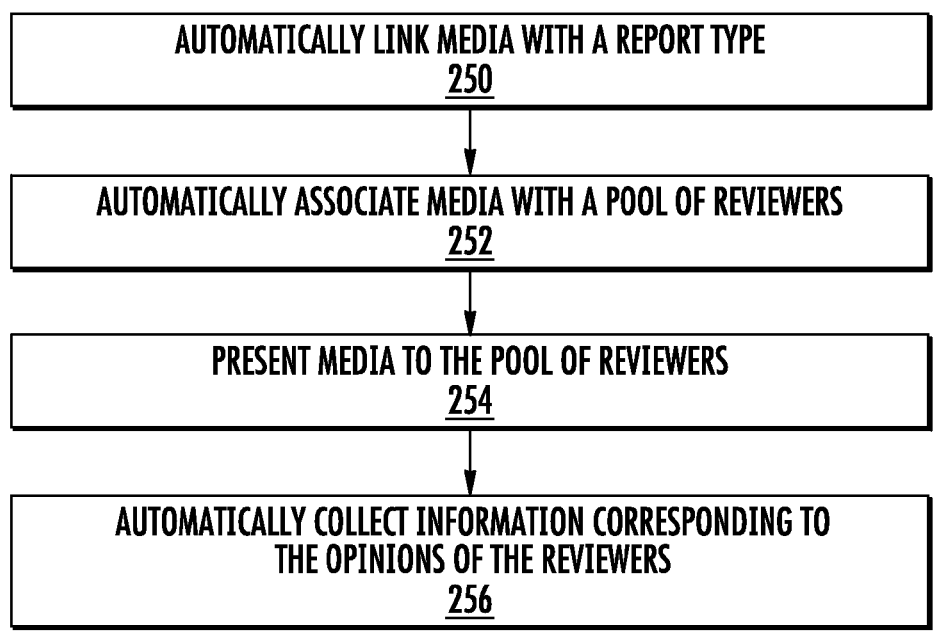
FIG. 5 is a flowchart depicting an example embodiment of a method for collection and automatic analysis of opinions of media.

FIG. 5 is a flowchart depicting an example embodiment of a method for collection and automatic analysis of opinions of media. As shown in FIG. 5, the method may be construed as beginning at block 250, in which media is automatically linked with a report type. For instance, if the user desires information related to a recorded music track and its chances of success in the US market, the media may be linked to a US Major Label Track Report, which includes information of how that track performed overall against other release quality tracks, how that track performed against other release quality tracks in the same musical genre, how much passion that track evoked in male versus female listeners, how much passion the track evoked in the 16-24 year old age group versus the 25-34 year old group, whether there was a consensus of opinion on the quality of the track or whether the track split opinion and whether there is any cross-over potential into other musical genre types.

In block 252, the media is automatically associated with a pool of reviewers. In some embodiments, only reviewers who are currently on-line are allocated to pools. Depending on the market research type ordered, the media may be presented to various pools of reviewers for consideration. Reviewers of pools may not be exclusive to each particular pool; reviewers may be members of many pools as long as they fulfill the entry criteria for that pool. Pool membership may be determined automatically and may be based on any number of factors including (but not exclusive to) age, gender, country, ethnicity, musical preference, marital status, employment status and behavior. Once a piece of media has achieved all the required reviews with a certain pool, the media may no longer be accessible via that pool. The media may, however, remain available via other pools should there be a requirement for responses from reviewers falling within a specific demographic profile.

As depicted in block 254, the media is presented to the associated pool(s) of reviewers and information corresponding to the reviewer opinions is collected (block 256). Along with determining which pools should be used, the market research type ordered may determine how many reviews are gathered from each pool. The review collection process is preferably double blind; the reviewers cannot choose which items they review and similarly the users requesting market research cannot choose which reviewers are presented with their media for consideration. The media is presented anonymously so as not to influence the opinion of the reviewer. Users may have the option of maintaining this anonymity after the review has been submitted or revealing details pertaining to the media to the reviewer after the review has been submitted in some embodiments.

FIGS. 6-8 are schematic diagrams depicting representative graphical user interfaces that may be used to implement functionality of an example embodiment. By way of example, when presented with media to review, the reviewer may be prompted to complete a free-text review of the media stating what is liked about the media (or the physical item represented by the media), what is disliked, what could be improved and any other general thoughts and comparisons to other similar items. As shown in FIG. 6, this may be accomplished by entering text into text field 302 of interface 300. The reviewer may be prompted to rate the media (or representative item) on a numeric scale (e.g., scale 304) based on what the reviewer believes the population at large would think of the item, with 0 being the lowest score (extreme dislike) and 10 being the highest score (extreme like) with gradation in between these two extremes.

The reviewer may also be prompted to answer some specific questions relating to the overall impression of the item or further demographic profiling questions. In the embodiment of FIG. 6, questions relating the reviewer's marital and employment status, with responses being collected via fields 306 and 308. The specific questions asked may depend on what additional information is required per item of media and which demographic profiling data is already held against the reviewer's profile.

Upon submission of the review, the reviewer may be paid for their submission. The value of this payment may depend on a number of factors, which may include the quality of their review and the reviewer's demographic profile. In this example, the reviewer's account information is depicted in fields 310 and 312.

In this embodiment, the free text provided in field 302 is analyzed to identify the quality of the review. In some embodiments, the system checks for whether the review was typed by hand (i.e. key-press rate), relevance (percentage of review that includes relevant descriptive terms), profanity (use of profane or banned words), repetition (both character and word) with an individual review, real language check (check for use of expected terms for a given language), length (number of words used), similarity comparison to previous reviews left by that user, similarity comparison to reviews left by previous users, positivity or negativity with the review and/or whether the free text review corroborates the numerical review that has been left and finally an evaluation of the topic words used.

Responsive to system acceptance of a review, the reviewer may be provided with a graphical prompt (such as a prompt configured as a pop-up window), an example of which is depicted in FIG. 7. Alternatively, if the review is not accepted, the reviewer may be provided with a different prompt. An example of such a prompt is depicted in FIG. 8, in which the reviewer is notified that the text-based comments do not appear to be relevant to the provided media.

Once a text-based review has been accepted and numerical and any additional questions accepted and validated, the data may be stored in a database. In some embodiments, incentives may be credited to the reviewer, and the reviewer may be offered another media item to review.

In some embodiments, the reviewer's reviewing history may be analyzed (such as at the time of submission) to determine their unique reviewer profile and their past success at reviewing media of that type. This results in a numerical influence factor, which may be used to weight the reviewer's response within the aggregate response for that piece of media. This may be accomplished without the knowledge of the reviewer.

Once all the reviews have been received from all the applicable pools for a piece of media and a time window (defined in hours from the point at which the report was ordered) has been exceeded, full data processing for the market research report may commence. In particular, a number of statistical and comparative measures are conducted on the review data for the media and in comparison to data retained on other media within the system dataset. This data is stored for further use.

After an additional time window (e.g., defined in hours) has passed, the data generated is automatically embedded in a report document, showing summary and detailed results in both text and graphical formats. This digital report is then stored for later retrieval and (if required) a notification sent to the user requesting the report to inform them that the report is ready. The user can then log back into their account and view the stored report.

FIGS. 9-20 are schematic diagrams depicting portions of an example embodiment of a report that may be provided to a user. In this regard, FIG. 9 depicts market potential of reviewed media, including overall market potential and market potential within genre. Overall market potential tends to be the most important commercial indicator for the track. It combines the Track Rating and the Passion Rating (described below) to give a definitive prediction of commercial success within the market. Typically, a minimum of score of 60% is considered commercially viable. It should be noted that a track that rates in the 'single' range has a good chance of chart success. Notably, chart success assumes a reasonable promotional budget. It should also be noted that the relative success of a single is also directly related to the existing profile of an artist.

Overall Market Potential indicates where the track is positioned among over 50,000 other tracks, in which "Excellent" indicates among the top 5% of all tracks, "Very good" indicates among the top 15% of all tracks, "Good" indicates among the top 30% of all tracks, "Above Average" indicates among the top 60% of all tracks, and "Average" indicates among the bottom 40% of all tracks.

Market Potential within the Pop Genre indicates where the track is positioned among thousands of other tracks in its own genre, and the track's commercial potential within this target market. "Excellent" indicates among the top 5% of all tracks in this genre, as well as a strong potential single in this market. "Very good" indicates among the top 15% of all tracks in this genre, as well as a potential single in this market. "Good" indicates among the top 30% of all tracks in this genre, as well as a potential album or promo track in this market. "Above Average" indicates among the top 60% of all tracks in this genre, and "Average" indicates among the bottom 40% of all tracks in this genre.

In some embodiments, a report may provide market potential data associated with various demographic segments. By way of example, market potential may be provided for reviewers in the United States in the 16-24 age range.

Figures 10, 11:
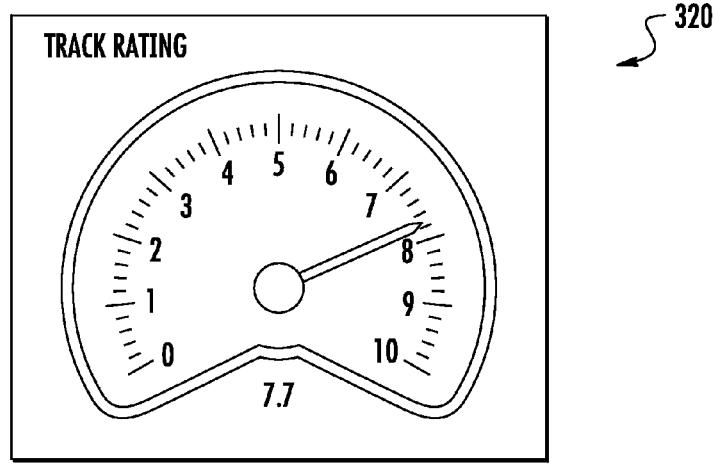

FIG. 10 depicts Track Rating as calculated from the weighted average of all the reviewers' ratings. In this embodiment, a dial 320 is used to display the track rating numeric value. This simply measures how 'good' the track is overall (not necessarily market potential). When combined with the Passion Rating, it gives an accurate prediction of the overall market potential for this track. A minimum of 7.0 indicates a high quality track. Summary is depicted in FIG. 11 that provides a brief textual summary of the reviews.

Figure 12:
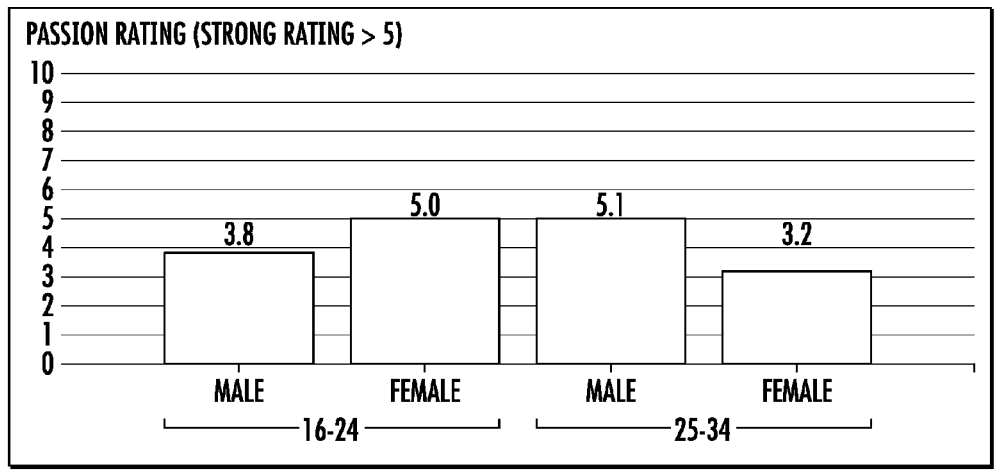

FIG. 12 depicts the Passion Rating, which indicates the intensity with which reviewers liked the track compared to how they have liked other tracks. For instance, the passion rating may indicate whether the reviewers thought the track was OK, liked it or loved it. This information may be correlated with demographic information of the reviewers. A "Loved" passion rating (7 or above) equates to strong sales potential.

Figure 13:
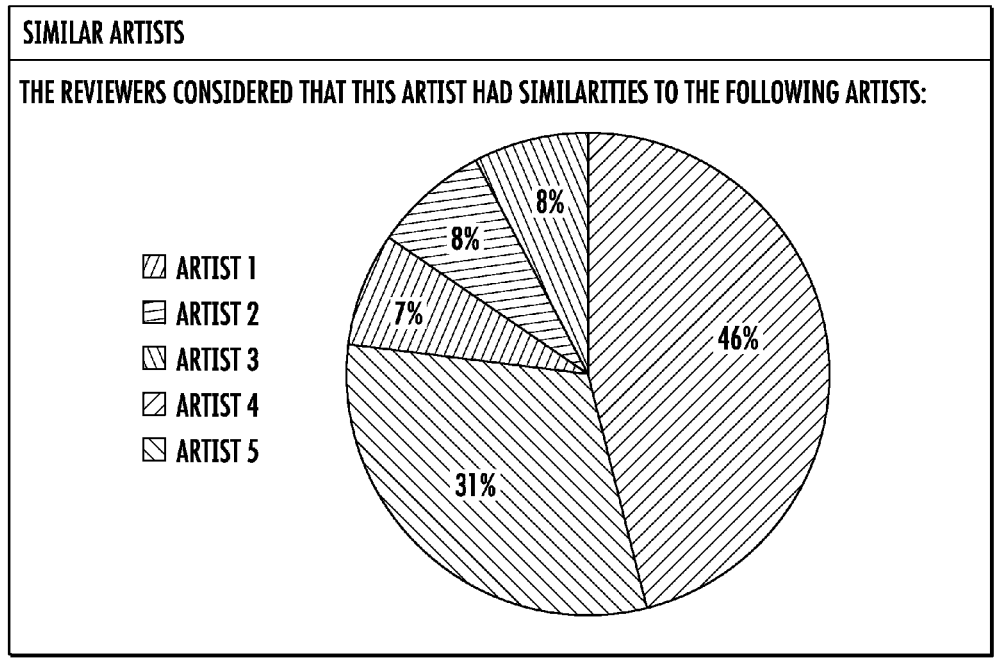
Figure 14:
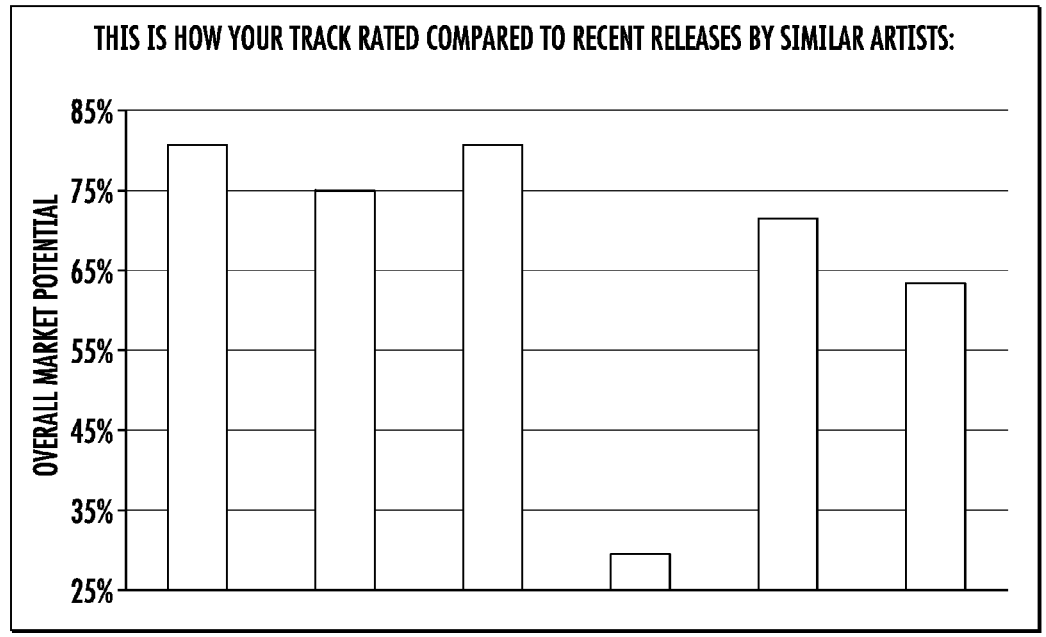

FIG. 13 depicts reviewer opinions regarding which other artists had similarities to the artist submitting the track that was reviewed. In contrast, FIG. 14 depicts how the reviewed track compares to similar artists with respect to overall market potential.

Figure 15:
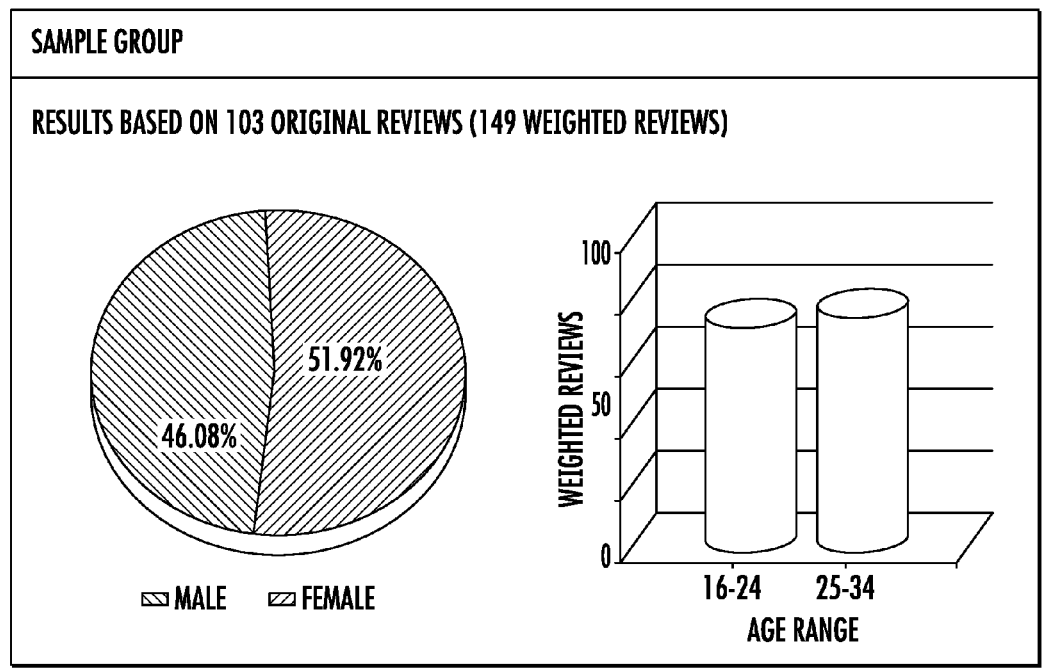

FIG. 15 depicts information about the reviewers (Sample Group). This is the group of music fans and consumers who have listened to the track online and left their track rating and written review. They may be sourced from another site, and they may not know they are conducting market research when they hear the track, which helps to achieve honest and objective responses. The sample group may be selected at random and screened by their age, gender, employment status, location, genre preferences and habits around music buying and social networking. A diverse sample group of reviewers is required to form a "smart crowd" which ensures an accurate Track Rating.

The reviews are written by music fans and consumers who must listen to at least a predetermined amount of the track (e.g., 60 seconds of the track) before giving a rating and writing their review. In some embodiments, the track and artist name are withheld from the reviewers.

Figure 16:
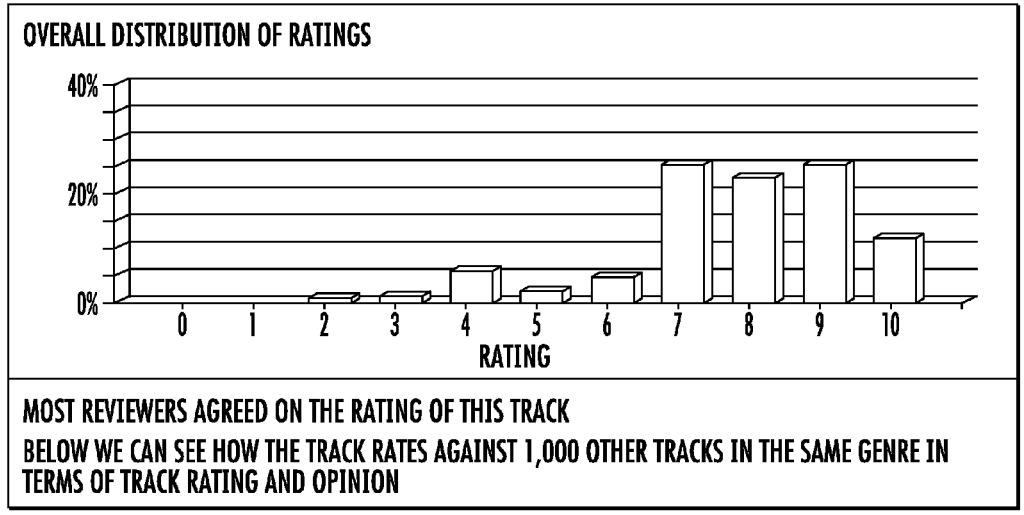

FIG. 16 depicts the overall distribution of the ratings, which may show whether or not there is agreement among the reviewers.

Figure 17:
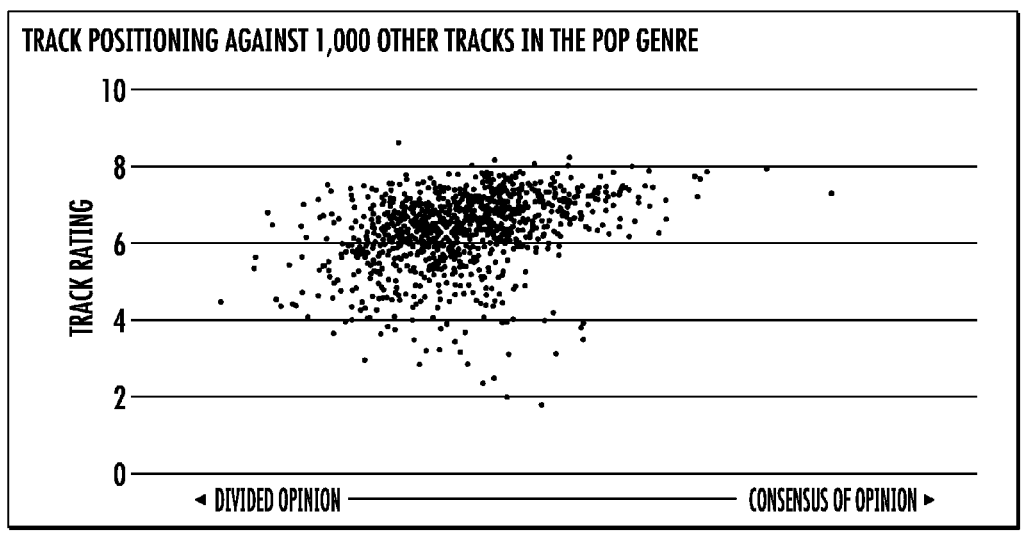

FIG. 17 depicts Track Positioning, in this case among 1000 other tracks of the same genre. This evaluates how the track compares against other major label new release tracks and against other tracks of the same genre and presents the results graphically. Tracks are charted according to their overall Track Rating and the consensus of opinion.

It should be noted that, in some embodiments, the better a reviewer is at judging the broader consensus rating of the track, the higher weighting their opinion receives. When calculating the overall Track Rating, each reviewer's track rating is weighted in accordance with their influence. For example, a track rating from a highly respected reviewer who has proved accurate in that past at identifying strong or weak tracks in that genre may carry many times as much influence as a track rating from an unproven reviewer.

Figure 18:
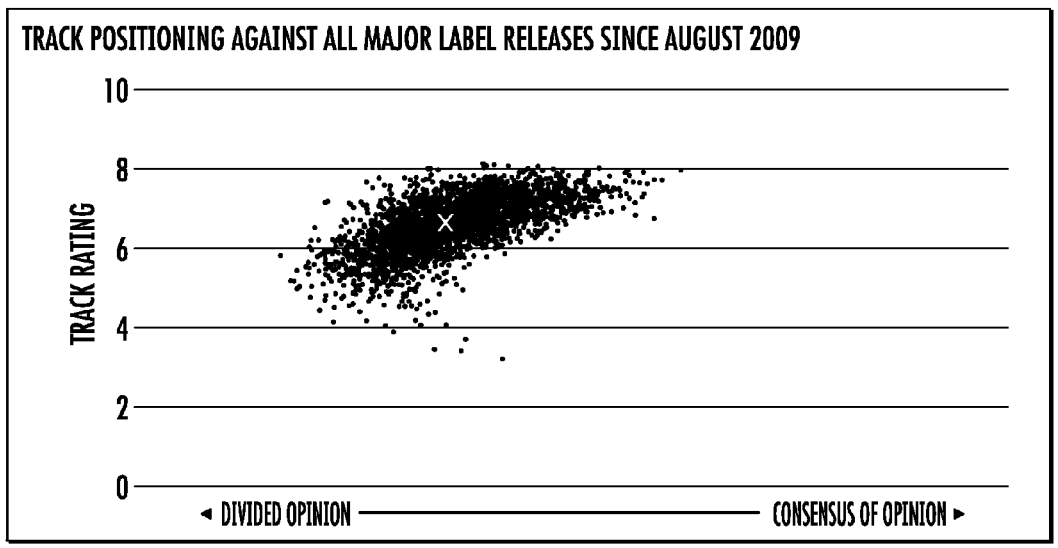

FIG. 18 depicts Track Positioning with respect to other releases. This information charts Track Rating versus whether there was consensus among the reviewers. In this example, the Track Positioning is provided with respect to all major label releases since August 2009.

Figure 19:
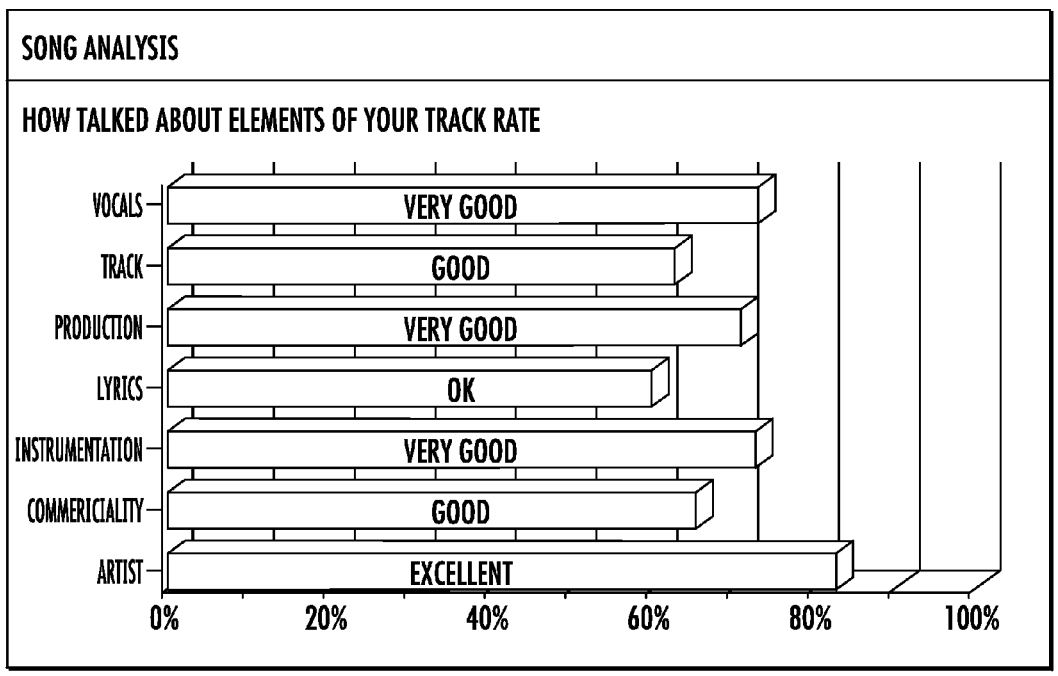

FIG. 19 depicts Song Analysis, which is generated using a technology that automatically "reads" all of the reviews and identifies which elements of the track the reviewers are commenting on the most. It then establishes whether the comments are positive or negative, collects all this information and displays the result as a graph. This analysis may be particularly useful to help improve songs or recordings.

Figure 20:
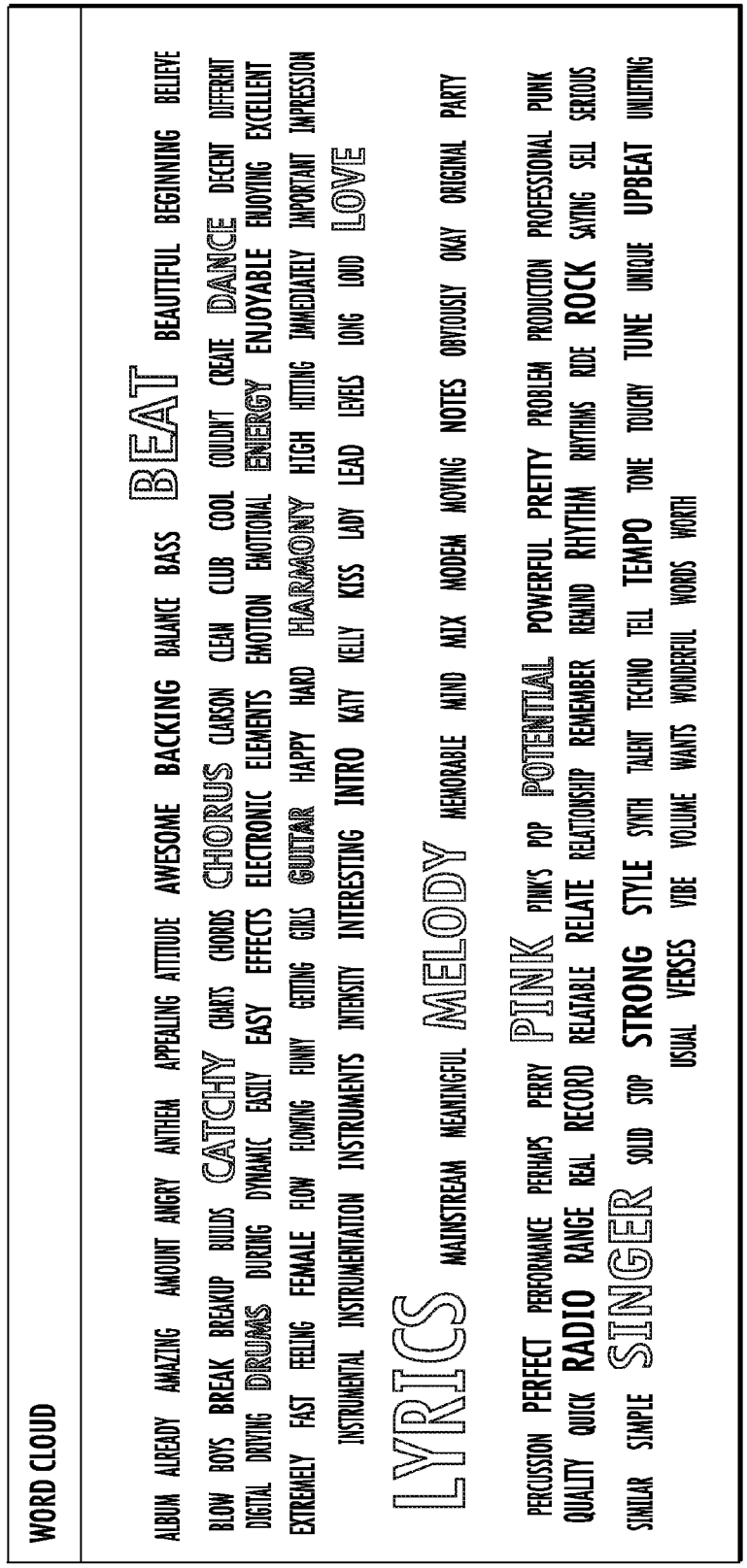

FIG. 20 depicts an example of a Word Cloud. This visualization reveals what emotions and key themes the reviewers mentioned most often in the reviews. The larger the word, the more it was used by the reviewers when describing the track.

With respect to the various portions of report described above, numerous variations may be provided. For instance, information used to provide a described portion may be filtered, such as with respect to demographics and/or genre, among others.

It is noted that the Wisdom of Crowds is a proven methodology that large groups of ordinary people organized under the right conditions (a "smart crowd") outperform small groups of experts in making decisions and predictions. It has been proven time and again that collective wisdom consistently surpasses the experts. It also means that in some embodiments, a 95% accuracy in Track Ratings may be provided. The 4 conditions required to form a "smart crowd" that delivers an accurate result are: 1) Diversity of opinion: A sample group of reviewers with many different points of view makes better decisions than one where everyone has the same information; 2) Independence: The reviewers' opinions are not influenced by others; 3) Decentralization: Answers are given by individual reviewers based on their own local and specific knowledge rather than by a central person; and, 4) Aggregation: There is a way of accurately measuring the sample group's collective answer.

It should be emphasized that the above-described embodiments are merely examples of possible implementations. Many variations and modifications may be made to the above-described embodiments without departing from the principles of the present disclosure. By way of example, if embodied in software, it should be noted that each described function may represent a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system. The machine code may be converted from the source code, etc. If embodied in hardware, each function may represent a circuit or a number of interconnected circuits to implement the specified logical function(s). All such modifications and variations are intended to be included herein within the scope of this disclosure and protected by the following claims.

The invention claimed is:

1. A method for collection and automatic analysis of opinions of media comprising:
   receiving, via a communications network, electrical signals embodying media for review;
   automatically distributing, via computer-executable instructions stored in memory and executed with processing circuitry, the media to a pool of reviewers based on reviewer profiles;
   receiving, electrical signals embodying opinions pertaining to the media;
   automatically generating, via the computer-executable instructions, statistical data relating to the media and to the reviewers based on the responses provided; and
   automatically generating, via the computer-executable instructions, a report based, at least in part, on the information received from the reviewers and the statistical data;
   wherein, in generating the report, the information received from a first of the reviewers is weighted based on the statistical data associated with the responses previously provided relating to accuracy of the first of the reviewers in reviewing other media of a genre of which the media is associated such that the higher the accuracy of the first of the reviewers in reviewing the other media of the genre, the higher the information from the first of the reviewers is weighted relative to others of the reviewers, and such that the lower the accuracy of the first of the reviewers in reviewing the other media of the genre, the lower the information from the first of the reviewers is weighted relative to others of the reviewers; and
   wherein, in automatically distributing the media to the pool of reviewers, the media is provided in a blind format such that an identity of a source of the media is not disclosed to the pool of reviewers.

2. The method of claim 1, further comprising validating the information received from the reviewers prior to generating the report.

3. The method of claim 1, further comprising grading the quality of information received from the reviewers prior to generating the report.

4. The method of claim 1, wherein the media comprises audio.

5. The method of claim 1, wherein the media comprises video.

6. The method of claim 1, wherein the media comprises still images.

7. The method of claim 1, wherein in receiving the media for review, the media is received indirectly from a user via a third party.

8. The method of claim 1, further comprising providing the report to a user.

9. The method of claim 8, wherein in providing the report to the user, the raw statistical data is provided to a third party.

10. The method of claim 8, wherein in providing the report to the user, the report is provided to the user via a third party.

11. The method of claim 1, wherein, in automatically distributing the media to the pool of reviewers, the media is provided in a blind format such that the reviewers are unable to select the media for review.

12. The method of claim 1, wherein automatically distributing the media to the pool of reviewers comprises automatically distributing the media only to the reviewers of the pool currently on-line.

13. The method of claim 1, wherein, in generating the report, predicted appeal of the media to a preselected demographic of consumers is provided.

14. A system for collection and automatic analysis of opinions of media, the system comprising:
   a processor circuit operative to execute instructions;
   a memory having computer-executable instructions stored thereon, the instructions being configured to, when executed by the processor:
   receive, from a user, media for review;
   automatically distribute the media to a pool of reviewers based on reviewer profiles with the media being provided in a blind format such that an identity of a source of the media is not disclosed to the pool of reviewers;
   receive, from the reviewers, information corresponding to opinions pertaining to the media;
   automatically generate a report based, at least in part, on the information received from the reviewers, wherein, in generating the report, the information received from a first of the reviewers is weighted based on accuracy of the first of the reviewers in reviewing other media of a genre of which the media is associated such that the higher the accuracy of the first of the reviewers in reviewing the other media of the genre, the higher the information from the first of the reviewers is weighted relative to others of the reviewers, and such that the lower the accuracy of the first of the reviewers in reviewing the other media of the genre, the lower the information from the first of the reviewers is weighted relative to others of the reviewers; and
   provide the report to the user.

15. The system of claim 14, wherein the system is further configured to validate the information received from the reviewers prior to generating the report.

16. The system of claim 14, wherein the system is further configured to grade the quality of information received from the reviewers prior to generating the report.

17. The system of claim 14, wherein at least a portion of the system is configured as a server.

18. A non-transitory computer-readable medium having stored thereon computer-executable instructions for performing collection and automatic analysis of opinions of media, the computer-executable instructions being configured to:
   receive, from a user, media for review;
   automatically distribute the media to a pool of reviewers based on reviewer profiles with the media being provided in a blind format such that an identity of a source of the media is not disclosed to the pool of reviewers;
   receive, from the reviewers, information corresponding to opinions pertaining to the media;
   automatically generate a report based, at least in part, on the information received from the reviewers, wherein, in generating the report, the information received from a first of the reviewers is weighted based on accuracy of the first of the reviewers in reviewing other media of a genre of which the media is associated such that the higher the accuracy of the first of the reviewers in reviewing the other media of the genre, the higher the information from the first of the reviewers is weighted relative to others of the reviewers, and such that the lower the accuracy of the first of the reviewers in reviewing the other media of the genre, the lower the information from the first of the reviewers is weighted relative to others of the reviewers; and provide the report to the user.

19. The computer-readable medium of claim 18, wherein the computer-executable instructions are further configured to validate the information received from the reviewers prior to generating the report.

20. The computer-readable medium of claim 18, wherein the computer-executable instructions are further configured to grade the information received from the reviewers prior to generating the report.

* * * * *